United States Patent
Yoda (10) Patent No.: US 7,255,218 B2
(45) Date of Patent: Aug. 14, 2007

(54) CIRCULATION TYPE LINE-UP CONVEYING APPARATUS

(75) Inventor: Kazue Yoda, Nagano-ken (JP)

(73) Assignee: Maruyasu Kikai Co., Ltd., Nagano-ken (JP)

( * ) Notice: Subject to any disclaimer, the term of this patent is extended or adjusted under 35 U.S.C. 154(b) by 0 days.

(21) Appl. No.: 11/146,048

(22) Filed: Jun. 7, 2005

(65) Prior Publication Data

US 2005/0269186 A1 Dec. 8, 2005

(30) Foreign Application Priority Data

Jun. 7, 2004 (JP) ............................. 2004-168442

(51) Int. Cl.
B65G 47/00 (2006.01)
B65G 47/12 (2006.01)
B65G 47/26 (2006.01)
B65G 47/10 (2006.01)
B65G 47/46 (2006.01)
B65G 37/00 (2006.01)

(52) U.S. Cl. ..................... 198/448; 198/443; 198/367

(58) Field of Classification Search ............... 198/448, 198/457.01, 433, 452, 457.02, 347.3, 385, 198/386, 465.1
See application file for complete search history.

(56) References Cited

U.S. PATENT DOCUMENTS

| | | | | |
|---|---|---|---|---|
| 4,252,232 A | * | 2/1981 | Beck et al. ................. | 198/443 |
| 4,289,227 A | * | 9/1981 | Matsui et al. ............... | 198/334 |
| 5,251,741 A | * | 10/1993 | Morishita et al. ......... | 198/690.1 |
| 6,412,621 B1 | * | 7/2002 | De Vree et al. ......... | 198/347.4 |
| 7,014,033 B2 | * | 3/2006 | Sticht et al. ............. | 198/465.1 |
| 2002/0175051 A1 | * | 11/2002 | Samson ................. | 198/550.01 |
| 2004/0016623 A1 | * | 1/2004 | Olson et al. ............. | 198/465.1 |

FOREIGN PATENT DOCUMENTS

JP 06156703 A * 6/1994 ................. 198/443

* cited by examiner

*Primary Examiner*—Gene O. Crawford
*Assistant Examiner*—Ramya G. Prakasam
(74) *Attorney, Agent, or Firm*—Bacon & Thomas, PLLC (57) ABSTRACT

This apparatus automatically lines up and forwards in a single line lengthwise objects supplied at random and in many lines and yet automatically returns objects overflowed from a line-up line to upstream. This apparatus includes: a cantilever type main conveying conveyor (A1) constructed from a plurality of conveying roller rollers of an oblique arrangement drivingly rotated by a non-contact transmission system, a return conveying conveyor (A2) having a conveying direction formed of drivingly opposite to the conveying direction of the main conveying-conveyor, and a delivery conveying conveyor (A3) for transferring objects conveyed by the return conveying conveyor to an upstream end of the main conveyor. The return conveying conveyor (A2) has been with an open end side of the conveying roller placed close to a side portion on the open side alongside a downstream side portion of the main conveying conveyor (A1).

2 Claims, 9 Drawing Sheets

CIRCULATION TYPE LINE-UP CONVEYING APPARATUS

BACKGROUND OF THE INVENTION

1. Field of the Invention

The present invention relates to a conveying apparatus for lining up objects (products) to be conveyed, which are carried out of a manufacturing line, in a single line lengthwise for conveying, and more particularly to a circulation type line-up conveying apparatus for lining up objects to be conveyed, which are irregularly carried out, in a single line lengthwise for the next process for conveying, and automatically returning objects to be conveyed which have been overflowed from a line-up line, upstream for conveying.

2. Description of the Related Art

In order to individually package products, which are irregularly carried out of the manufacturing line, in the next process, it is necessary to line up and convey the products. For example, in a bun factory, in order to individually package buns to be carried out of the manufacturing line, it is necessary to line up the buns in a single line lengthwise at predetermined intervals for conveying.

As the line-up conveying means, there has been proposed a method (See, for example, Patent Reference 1 (Japanese Published Unexamined Patent Application No. 8-81045)) whereby for example, a conveying apparatus is constituted by contiguously providing a plurality of belt conveyors in a single line lengthwise, and a speed difference is given to the revolution speeds of the belt conveyors to thereby separate the products at a transferred portion from a conveyor to another conveyor, and further guides are provided on the conveyors to thereby line up the products in a single line lengthwise. In another method (See, for example, Patent Reference 2 Japanese Published Unexamined Patent Application No. 6-345236)) a guide device is installed for drawing the products into a line on the downstream side (in the neighborhood of an outlet) of the conveying apparatus, or the like.

In the case of the line-up conveying apparatus described in the Patent Reference 1, however, since the plurality of belt conveyors are contiguously provided in a single line lengthwise and arranged, large installation space for the line-up conveying apparatus is required, and further as pretreatment for supplying the products to the line-up conveying apparatus, conveyors and the like for lining up in a single line sideways, having a forcible feeding finger for conveying the object group in a predetermined direction, and further other equipment are required, leading to a problem that the requirements will be expensive.

Also, in the line-up conveying apparatus described in the Patent Reference 2, there may be cases where the products get delayed in the vicinity of the upstream of the guide device, and in that case, an operator has to manually remove the delayed products. There is an inconvenience that in order to return the products to the line-up conveying apparatus, the operator or the like will be required.

The present invention has been achieved in view of the problems that the above-described conventional techniques have had, and is aimed to provide a circulation type line-up conveying apparatus capable of automatically lining up objects, which have been supplied in disorder and in many lines, in a single line lengthwise for forwarding, and automatically returning objects, which have been overflowed from the line-up line, to an upstream part of the conveying apparatus.

SUMMARY OF THE INVENTION

In order to achieve the above-described object, according to the present invention, there is provided technical means including: a cantilever type main conveying conveyor in which conveying rollers rotating in accordance with a non-contact type power transmission system are obliquely arranged on a side of a side plate which has been arranged to stand up on one side of the rollers in the axial direction, and the width of the conveying rollers at least in the vicinity of a downstream side in the conveying direction is made narrower, a return conveying conveyor formed of cantilever type conveying rollers rotating in a direction opposite to the conveying direction of the main conveying conveyor, and a delivery conveying conveyor, constructed by conveying rollers rotating in accordance with the non-contact type power transmission system, for transferring objects to be conveyed, which have been conveyed by the return conveying conveyor, to the upstream part of the main conveying conveyor, wherein the return conveying conveyor has been arranged with an upstream open end side placed alongside a downstream open side of the main conveying conveyor.

The width of the conveying roller of the main conveying conveyor on the downstream side is set in accordance with the width and the like of the objects to be conveyed, and if there are the objects to be conveyed within the width, they are adapted to be lined up for being forwarded.

According to the above-described means, objects to be conveyed, which are supplied in disorder and in many lines, are conveyed downstream of the conveying conveyor by the rotations of the conveying rollers of the main conveying conveyor, and since the conveying rollers have been obliquely arranged (skewed) toward the side plate side, the objects to be conveyed are conveyed so as to shift toward the side plate side, and are lined up in a single line lengthwise with the narrow width of the conveying rollers of the main conveying conveyor on the downstream side for being forwarded. Thus, the objects to be conveyed which have protruded outwardly from the width of the conveying rollers on the downstream side of the main conveying conveyor are automatically conveyed upstream of the main conveying conveyor by the rotations, in the opposite direction, of the conveying rollers of the return conveying conveyor provided alongside the main conveying conveyor, and the objects to be conveyed are transferred upstream of the main conveying conveyor from the return conveying conveyor via the delivery conveying conveyor. Thereby, the objects to be conveyed which have been overflowed from the line-up line are automatically returned upstream of the main conveying conveyor by means of both the return conveying conveyor and the delivery conveying conveyor, and are supplied to the line-up conveying again.

Also, the delivery conveying conveyor is arranged between the upstream side of the main conveying conveyor and the downstream side of the return conveying conveyor. In this case, a planar shape of the delivery conveying conveyor is substantially triangular, for example, a rectangular triangle. Also in this case, the downstream side of the return conveying conveyor narrows (the width of the conveying rollers on the open end side are successively narrower) whereby between the upstream side of the main conveying conveyor and the downstream side of the return conveying conveyor, a triangular space is formed, and within the space, the triangular delivery conveying conveyor is arranged.

According to the above-described means, by the rotations of the conveying rollers of the delivery conveying conveyor arranged between the downstream side of the return conveying conveyor and the upstream side of the main conveying conveyor, the objects to be conveyed transferred onto the delivery conveyor on the downstream side of the return conveying conveyor are transferred onto the main conveying conveyor. Thereby, the objects to be conveyed that are overflowed from the line-up line of the main conveying conveyor can be smoothly returned from the return conveying conveyor to the main conveying conveyor.

Further, the delivery conveying conveyor comprises conveying rollers in which within a tubular member made of non-magnetic material, a ring of a permanent magnet is fitted and fixed, inside the tubular member on both sides in the axial direction, a bearing is fitted and fixed, and over the bearings on both sides thereof, a supporting shaft is provided to make the tubular member freely rotatable. A driving magnetic wheel corresponding to the permanent magnet of the conveying roller is arranged to intersect an outer peripheral surface of the roller in non-contact relationship therewith and freely rotatable in proximity thereto in such a manner that the conveying rollers are rotated by rotations of the driving magnetic wheel.

According to the above-described means, the delivery conveying conveyor has only a frame for rotatably supporting the conveying roller in the outside of the roller in the axial direction, and has no driving roller and the like for driving the conveying roller. Thereby, when the delivery conveying conveyor is arranged between the open end portions of the both conveying rollers of the main conveying conveyor and the return conveying conveyor, these can be arranged without creating large clearance between the conveying roller of the main conveying conveyor and the conveying roller of the return conveying conveyor, enabling the smooth transfer of the objects to be conveyed.

Also, the side plates (guides) of the main conveying conveyor and the return conveying conveyor may be constituted by a side conveyor formed of a belt conveyor or a roller conveyor.

When the side plate is constituted by plate material such as a metallic plate or a synthetic resin plate, if the objects to be conveyed are substantially circular and hard, they will not adhere but be easily spaced apart to be conveyed even if they come into contact with the side plate. If, however, the objects to be conveyed are soft ones such as confectionery and bread, when they come into contact with the side plate, they may adhere and affect the conveying.

When the side plate is constituted by a side conveyor, however, since the objects to be conveyed are forcibly conveyed by the driving of the side conveyor, the problem is eliminated. In this respect, the side conveyor may be driven by the non-contact type power transmission system of the conveying conveyor of the present conveying apparatus, or by a system exclusive to the side conveyor.

The circulation type line-up conveying apparatus according to one embodiment is capable of automatically lining up the objects to be conveyed, which are supplied in disorder and in many lines, into a single line lengthwise for forwarding. The objects to be conveyed, which have overflowed from the line-up line, can be automatically returned upstream of the main conveying conveyor for lining up and conveying by means of both the return conveying conveyor and the delivery conveying conveyor. Thus, the so-called bridge, in which some objects to be conveyed and other objects to be conveyed on the downstream side (in the vicinity of an outlet) of the main conveying conveyor are intertwined, can be prevented. Moreover, since the driving system of the conveying rollers is of the non-contact type driving system using a magnet, it is possible to eliminate problems of broken belts, occurrence of noise and the like that have occurred in the conventional conveying roller driving systems (such as round belt driving systems, chain driving systems, flat and V belt driving systems), and to be freed from maintenance.

Also, according to another aspect, the circulation type line-up conveying apparatus is capable of smoothly performing the return conveying from the return conveying conveyor to the main conveying conveyor, and performing the return operation within a short extent of conveying distance.

Further, these can be arranged with both sides of the conveying rollers of the delivery conveying conveyor placed in proximity to the open end side of the conveying rollers of the main conveying conveyor and the return conveying conveyor. Thereby, the transfer from the return conveying conveyor onto the delivery conveying conveyor and the transfer from the delivery conveying conveyor onto the main conveying conveyor can be smoothly performed on a flush surface.

Also, even soft objects to be conveyed can be reliably lined up and conveyed.

Therefore, the circulation type line-up conveying apparatus can be constituted by three non-contact driving system roller type conveying conveyors, there is no need for fine control by a robot or the like, and the circulation type line-up conveying apparatus can be manufactured at low cost.

BRIEF DESCRIPTION OF THE DRAWINGS

FIGS. 7A and 7B are explanatory views illustrating a line-up conveying operation of objects to be conveyed.

DETAILED DESCRIPTION OF THE PREFERRED EMBODIMENTS

Hereinafter, with reference to the drawings, the description will be made of an embodiment of the present invention.

Figure 1:
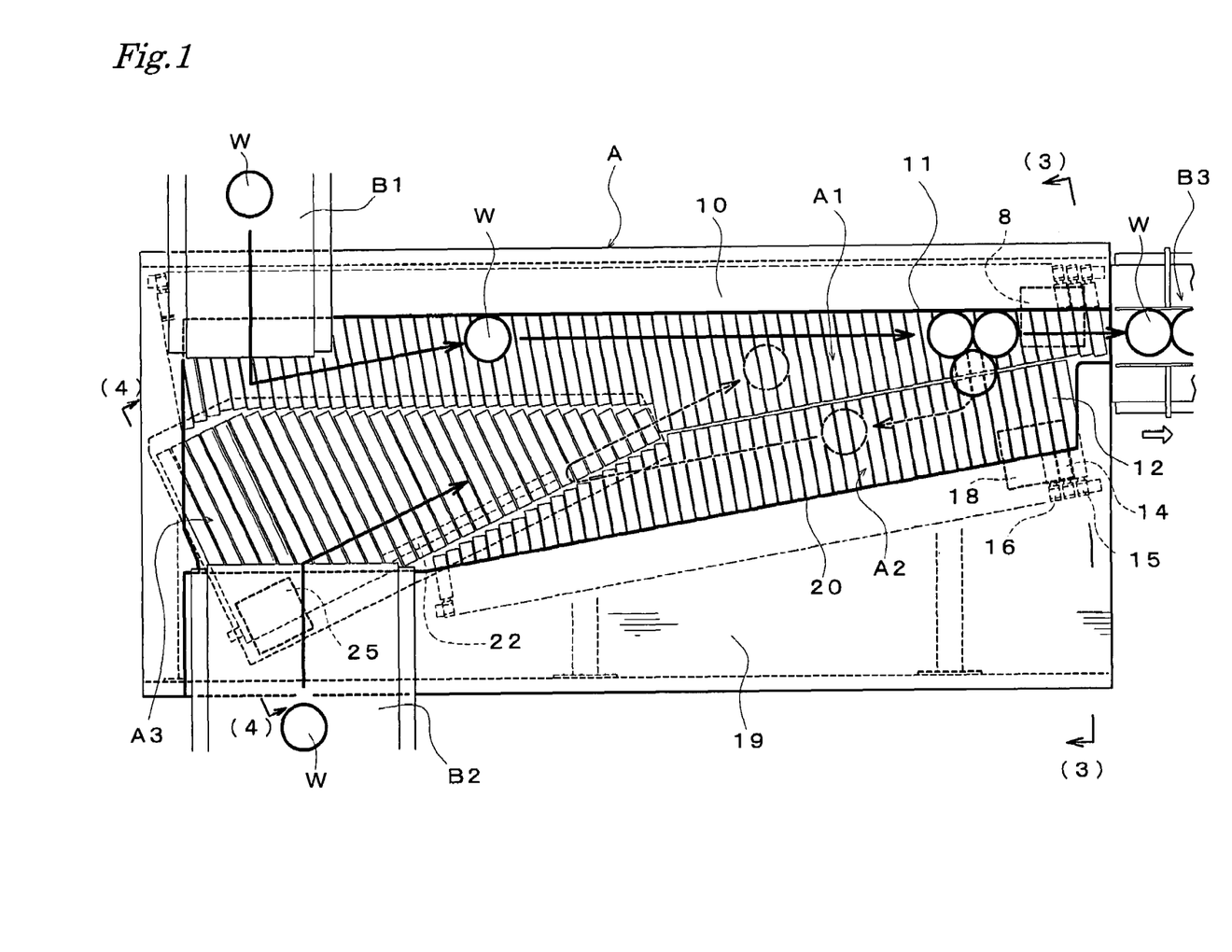
FIG. 1 is a schematic plan view showing a circulation type line-up conveying apparatus according to an embodiment of the present invention.

FIG. 1 is a plan view showing an outline of a circulation type line-up conveying apparatus A according to the present invention, which is formed of three conveying roller conveyors: a main conveying conveyor A1, a return conveying conveyor A2 and a delivery conveying conveyor A3. On the upstream side of the main conveying conveyor A1 and the delivery conveying conveyor A3 in the respective conveying directions, supply conveyors B1 and B2 supplying the objects W to be conveyed are arranged while on the downstream side of the main conveying conveyor A1, a carrying-out conveyor B3 has been arranged for conveying the objects W to be conveyed lined up in a single line lengthwise to the next process.

The above-described main conveying conveyor A1 is constituted by a cantilever type roller conveyor in which a plurality of conveying rollers 1 rotating in accordance with a non-contact type power transmission system have been obliquely arranged on the side of a side frame which has been arranged to stand up on one side of the rollers in the axial direction.

Hereinafter, with reference to FIGS. 1 to 3, the description will be made of the details. Along the shaft center of each conveying roller 1 made of synthetic resin, a supporting shaft 2 is inserted and fixed, one end portion of the supporting shaft 2 is extended and is caused to protrude outwardly from the roller, the protruded end portion is supported by a roller holder 3 equipped with a bearing. A driven magnetic wheel 4 is fixed to a protruded end portion of the supporting shaft 2 further protruding outwardly of the roller holder 3. Thus, the roller holders 3 are fixed in parallel at regular intervals on a backing plate 5' mounted on the trestle 5, and arranged to incline by a predetermined angle (for example, about 10°) toward the conveying direction.

Also, at a position lower than the driven magnetic wheel 4 at the end portion of the supporting shaft 2 supported by the roller holder 3, outside of the rotation shaft 6a, a driving shaft 6 to which a short tubular driving magnetic wheel 6b has been fitted and fixed correspondingly to the driven magnetic wheel 4 is axially mounted rotatably to intersect the outer peripheral surface of the driven magnetic wheel 4 in a non-contact state and substantially at right angles. The driving shaft 6 has substantially the same length as the length of a carrier path constituted by the side-by-side conveying rollers 1.

Thus, at the shaft end of the rotation shaft 6a of the driving shaft 6, a timing pulley 7a is fixed; to the output shaft of a driving motor 8 mounted onto the backing plate 5', a timing pulley 7b is fixed; and between the timing pulley 7a and the timing pulley 7b, a timing belt 7c is spanned in such a manner that the driving shaft 6 is rotated by the operation of the driving motor 8.

Thereby, a conveying roller 1 cantilever-supported by a roller holder 3 is rotated by attraction and repulsion of the driving magnetic wheel 6b of the driving shaft 6 which drivingly rotates by the operation of the driving motor 8, and the driven magnetic wheel 4 fixed to the supporting shaft 2 of the conveying roller 1.

Figure 2:
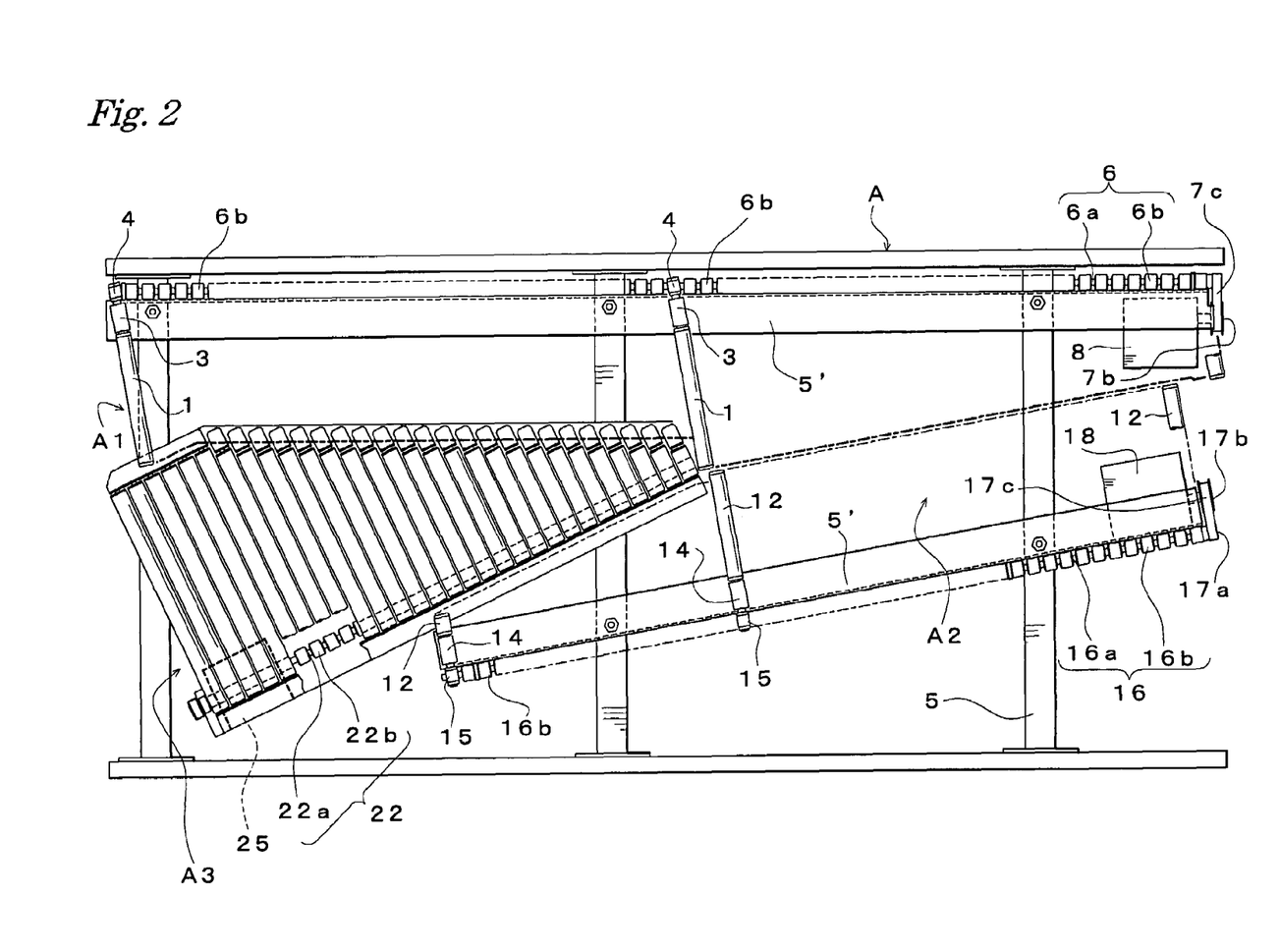
FIG. 2 is a schematic plan view showing a driving mechanism for each conveying conveyor constituting the circulation type line-up conveying apparatus.

Also, in the main conveying conveyor A1, as shown in FIGS. 1 and 2, the roller width of the conveying rollers 1 constituting the an upstream portion of a carrier path of the main conveying conveyor A1 are substantially the same length due to their relationship with the delivery conveying conveyor A3 located alongside the main conveying conveyor A1 while a downstream portion of the carrier path is constructed such that the roller widths become gradually narrower toward the downstream end of the main conveying conveyor. The width of the conveying roller 1 located at the end of the main conveying conveyor A1 in the conveying direction is formed to be slightly larger than the width (or diameter when the objects to be conveyed are circular) of the objects W to be conveyed in such a manner that the objects W being conveyed are lined up in a single line lengthwise at the outlet of the main conveying conveyor A1.

The above-described driven magnetic wheel 4 and driving magnetic wheel 6b are rings made of a permanent magnet, and are constructed such that an N-pole and S-pole are spirally magnetized on the outer peripheral surface. In this respect, for the details of the structure in which a conveying roller supported by the cantilever supporting structure is rotated by the non-contact type driving mechanism using the magnetic force, please refer to Japanese Published unexamined Patent Application No. 7-177725.

Figure 6:
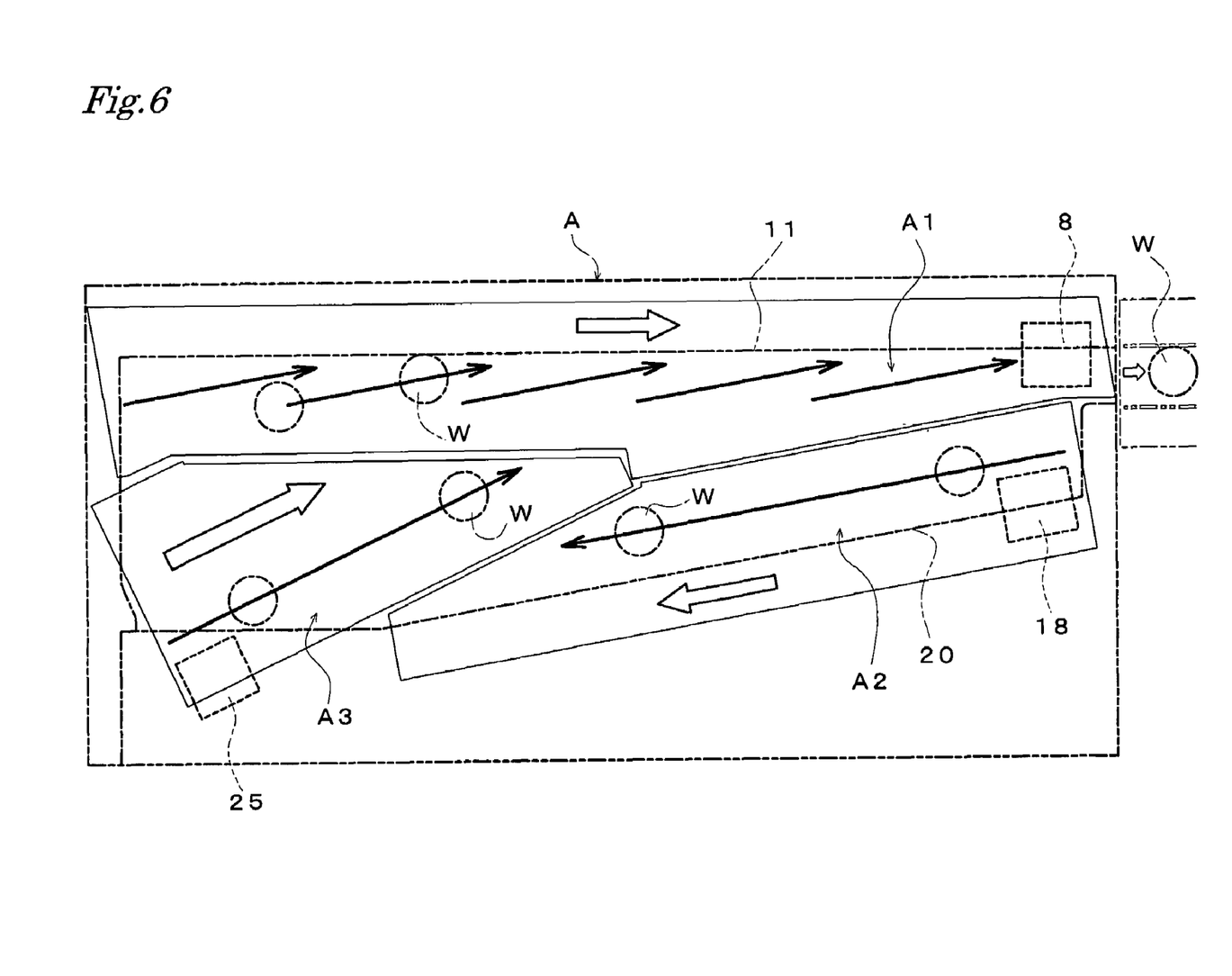
FIG. 6 is an explanatory view showing speed and conveying directions of each conveying conveyor constituting the circulation type line-up conveying apparatus.

In the main conveying conveyor A1 constructed as described above, the roller holder 3 and the driven magnetic wheel 4 portions which are located in the outside of the conveying rollers 1 are covered with a cover member 10 attached via a frame 9 fixed to the trestle 5. On the cover member 10, aside plate 11 is formed substantially vertically along the end portion of the conveying rollers 1 on the roller holder 3 side. The side plate 11 operates as a guide for lining up the objects W to be conveyed. In other words, the objects W to be conveyed are conveyed so as to shift toward the side plate 11 side as shown in FIG. 6. In this respect, a guide operation of the side plate 11 is brought about from the structure in which the conveying rollers 1 of the cantilever supporting structure are arranged to incline (skew) by a predetermined angle in the conveying direction, toward the side plate 11 side.

A return conveying conveyor A2, comprised of a plurality of conveying rollers 12 of the cantilever supporting structure drivingly rotating in accordance with the non-contact type power transmission system, is disposed with an upstream portion alongside the downstream portion of the main conveying conveyor A1.

Figure 3:
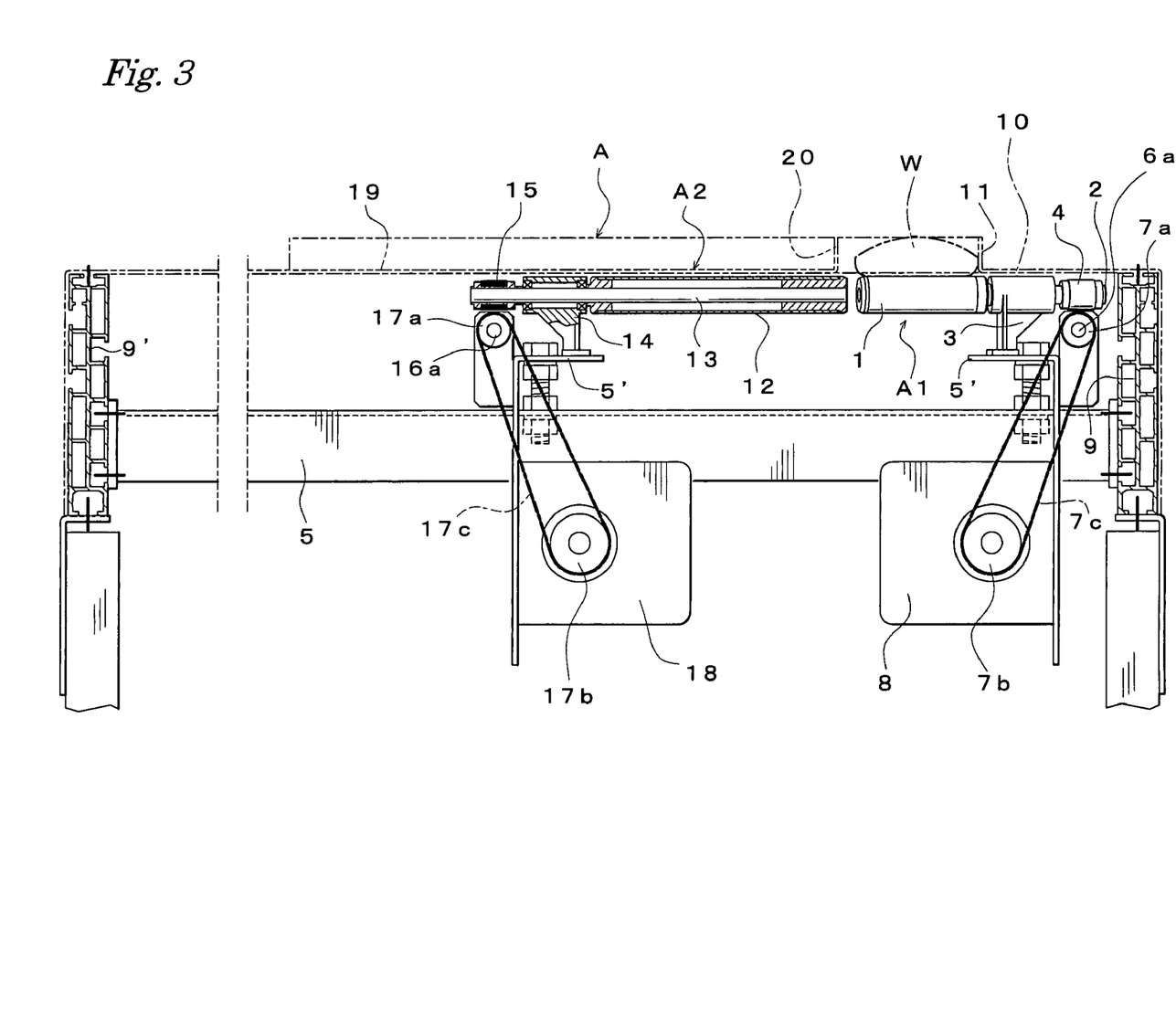
FIG. 3 is a partially exploded enlarged side view taken on line (3)-(3) in FIG. 1.

In the return conveying conveyor A2, as shown in FIG. 3, along the shaft center of each conveying roller 12 made of synthetic resin, a supporting shaft 13 is inserted and fixed; one end portion of the supporting shaft 13 is extended and is caused to protrude outwardly from the roller; the protruded end portion is supported by a roller holder 14 equipped with a bearing. A driven magnetic wheel 15 is fixed to a protruded end portion of the supporting shaft 13 further protruding outwardly of the roller holder 14. Thus, the roller holders 14 are fixed in parallel at regular intervals on a backing plate 5' mounted on the trestle 5 such that the shaft center of the conveying rollers 12 are parallel with the shaft center of the conveying rollers 1 of the main conveying conveyor A1. In this respect, in the embodiment illustrated, the shaft centers of the conveying rollers 1 and 12 have been made parallel, and like the conveying rollers 1 of the main conveying conveyor A1, the conveying rollers 12 may be arranged to incline toward the side plate 20 side.

Also, at a position lower than the driven magnetic wheel 15 at the end portion of the supporting shaft 13 supported by the roller holder 14 outside of the rotation shaft 16a, a driving shaft 16 to which a short tubular driving magnetic wheel 16b has been fitted and fixed correspondingly to the driven magnetic wheel 15 is axially mounted rotatably to intersect the outer peripheral surface of the driven magnetic wheel 15 in a non-contact state therewith and substantially at right angles. The driving shaft 16 has substantially the same length as the length of a carrier path constituted by the side-by-side conveying rollers 12.

Thus, at the shaft end of the rotation shaft 16a of the driving shaft 16, a timing pulley 17a is fixed; to the output shaft of a driving motor 18 mounted onto the backing plate 5', a timing pulley 17*b* is fixed; and between the timing pulley 17*a* and the timing pulley 17*b*, a timing belt 17*c* is spanned in such a manner that the driving shaft 16 is rotated by the operation of the driving motor 18.

Thereby, a conveying roller 12 cantilever-supported by a roller holder 14 is rotated by attraction and repulsion of the driving magnetic wheel 16*b* of a driving shaft 16 which drivingly rotates by operation of the driving motor 18, and the driven magnetic wheel 15 fixed to the supporting shaft 13 of the conveying roller 12.

The direction of rotation of the conveying rollers 12 is set to a direction opposite to the direction of rotation of the conveying rollers 1 of the main conveying conveyor A1, such that a conveying direction of the return conveying conveyor A2 is opposite that of the main conveying conveyor A1. The return conveying conveyor A2 is arranged with an open end side thereof placed in proximity to an open end side of the main conveying conveyor A1.

Also, in the return conveying conveyor A2, as shown in FIGS. 1 and 2, the roller width of the conveying rollers 12 within an extent of about two-thirds of the full length toward the conveying direction from the upstream end of the carrier path of the return conveying conveyor A2 are set to the same width, while the roller width of the conveying rollers 12 within a remaining downstream portion to the downstream end of the return conveying conveyor A2 such that the roller width becomes gradually narrower toward the downstream end of the return conveying conveyor A2. An oblique side portion of the downstream portion of the return conveyor A2, due to the narrowing roller widths, enables a transfer operation onto the delivery conveying conveyor A3, to be smoothly performed, and at the same time, the transfer of the objects to be conveyed occurs within a short carrier path.

In the return conveying conveyor A2 constructed as described above, the roller holder 14 and the driven magnetic wheel 15 portions which are located in the outside of the conveying rollers 12 are covered with a cover member 19 attached via a frame 9' fixed to the trestle 5. On the cover member 19, a side plate 20 is formed substantially vertically along the end portion of the conveying rollers 12 on the roller holder 14 side. The side plate 20 operates as a guide for conveying the objects W to be conveyed which have been transferred onto the return conveying conveyor A2 from the main conveying conveyor A1. In this respect, the side plate 20 effectively operates to smoothly perform the transfer onto the delivery conveying conveyor A3 which is provided alongside on the oblique side portion where the width of the carrier path on the downstream side of the return conveying conveyor A2 becomes narrower.

Figure 4:
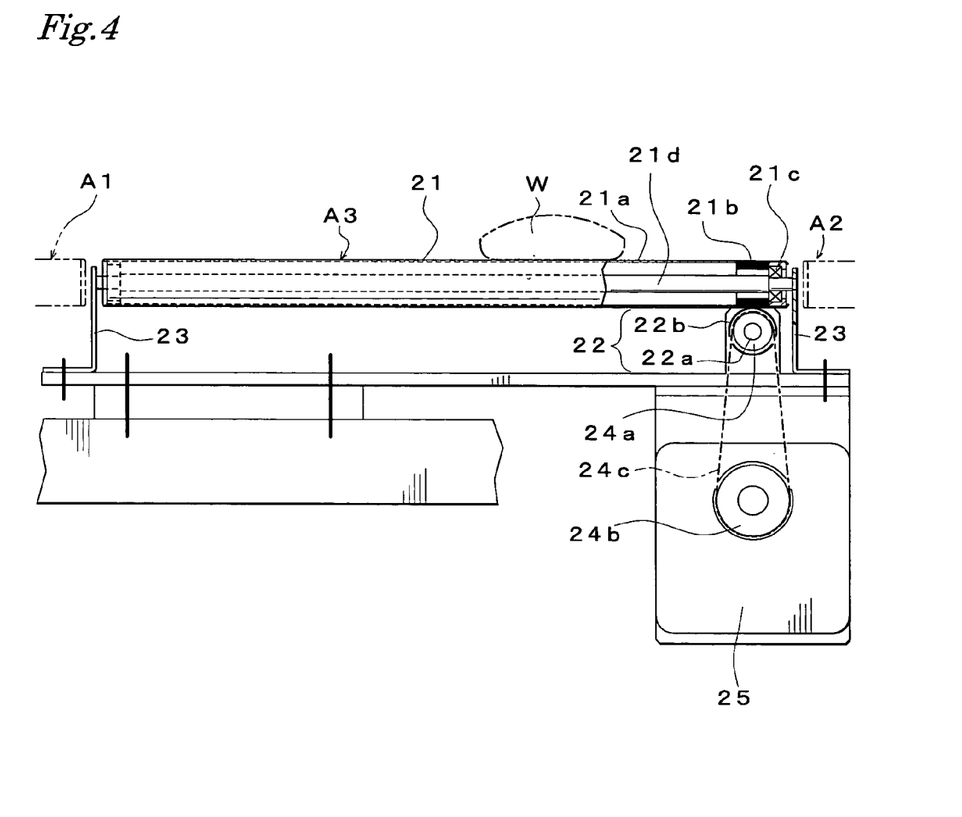
FIG. 4 is a partially exploded enlarged side view taken on line (4)-(4) in FIG. 1.

The delivery conveying conveyor A3 includes a plurality of conveying rollers 21 in which within a tubular member 21*a* made of non-magnetic material, for example, stainless material, a ring 21*b* of a permanent magnet is fitted and fixed. Inside the tubular member 21*a* on both ends in the axial direction, a bearing 21*c* is fitted and fixed. A supporting shaft 21*d* is provided through the bearings 21*c* to make the tubular member 21*a* freely rotatable. A driving shaft 22 is arranged to intersect the outer peripheral surface of the conveying roller at a position corresponding to the permanent magnet 21*b* of the conveying roller 21 in a non-contact state therewith and freely rotatable in proximity thereto in such a manner that the conveying roller 21 rotates by the rotations of the driving shaft 22.

In other words, this delivery conveying conveyor A3 supports both ends of the supporting shafts 21*d* on a supporting plate 23 having an L-shape in cross section such that both side end portions of the roller width of the conveying roller 21 constituting the carrier path can be arranged in such a manner that the open end side of the main conveying conveyor A1 and the open end side of the return conveying conveyor A2 are in proximity to each other respectively, and the driving means of the conveying rollers 21 is constructed in accordance with the non-contact type power transmission system including the ring 21*b* of a permanent magnet embedded within the tubular member 21*a* of the conveying roller 21, and the driving shaft 22 arranged directly below the conveying roller 21 correspondingly to the ring 21*b* (See FIG. 4).

Also, at a position lower than the ring 21*b* embedded in the conveying roller 21, outside of the rotation shaft 22*a*, a driving shaft 22 to which a short tubular driving magnetic wheel 22*b* is fitted and fixed correspondingly to the ring 21*b* has been axially mounted rotatably to intersect the outer peripheral surface of the conveying roller 21 in a non-contact state therewith and substantially at right angles. The driving shaft 22 has substantially the same length as the length of a carrier path constituted by the side-by-side conveying rollers 21.

Thus, at the shaft end of the rotation shaft 22*a* of the driving shaft 22, a timing pulley 24*a* is fixed; to the output shaft of a driving motor 25 mounted onto the backing plate 5', a timing pulley 24*b* is fixed; and between the timing pulley 24*a* and the timing pulley 24*b*, a timing belt 24*c* is spanned in such a manner that the driving shaft 22 is rotated by the operation of the driving motor 25.

Thereby, a conveying roller 21, supported at both ends by the supporting plate 23, is rotated by attraction and repulsion of the driving magnetic wheel 22*b* of a driving shaft 22 which drivingly rotates by operation of the driving motor 25, and the ring 21*b* of the permanent magnet fitted and fixed inside the conveying roller 21.

The direction of rotation of the conveying rollers 21 has been set to the same direction as the direction of rotation of the conveying rollers 1 in the main conveying conveyor A1, whereby the objects W which have been transferred from the return conveying conveyor A2, are transferred onto the main conveying conveyor A1.

An overall shape of the delivery conveying conveyor A3 is formed into a substantially right triangle shape in plane such that it can be installed in space having a substantially right triangle shape in plane between the upstream side of the main conveying conveyor A1 and the downstream side of the return conveying conveyor A2. In other words, the roller width of the conveying rollers 21 constituting the carrier path of the delivery conveying conveyor A3 become gradually narrower from the upstream side toward the downstream side in the conveying direction.

The main conveying conveyor A1, the return conveying conveyor A2 and the delivery conveying conveyor A3 which have been constructed as described above are arranged by placing the end portions of the conveying rollers 1, 12 and 21 of the respective conveyors A1, A2 and A3 in proximity to one another, whereby it is possible to form a conveying surface free from such clearances as to drop the objects W to be conveyed, and yet free from any obstacle which hinders the objects W to be conveyed from being transferred.

A speed difference is given to the conveying speeds of the main conveying conveyor A1, the return conveying conveyor A2 and the delivery conveying conveyor A3 respectively, whereby it is possible to smoothly perform separation and transfer between the conveyors as shown in FIG. 6. The conveying speeds of the main conveying conveyor A1, the return conveying conveyor A2 and the delivery conveying conveyor A3 are set to, for example, main conveying conveyor A1<return conveying conveyor A2<delivery conveying conveyor A3, and the objects W to be conveyed overflowed from the line-up conveying line of the main conveying conveyor A1 are quickly returned to the main conveying conveyor A1, whereby it is possible to enhance the throughput capacity of the line-up conveying processing. In this respect, differences in speed of each conveying conveyor in FIG. 6 are indicated by length (high speed: long, low speed: short, intermediate speed: medium) of hollow arrows.

Figure 5:
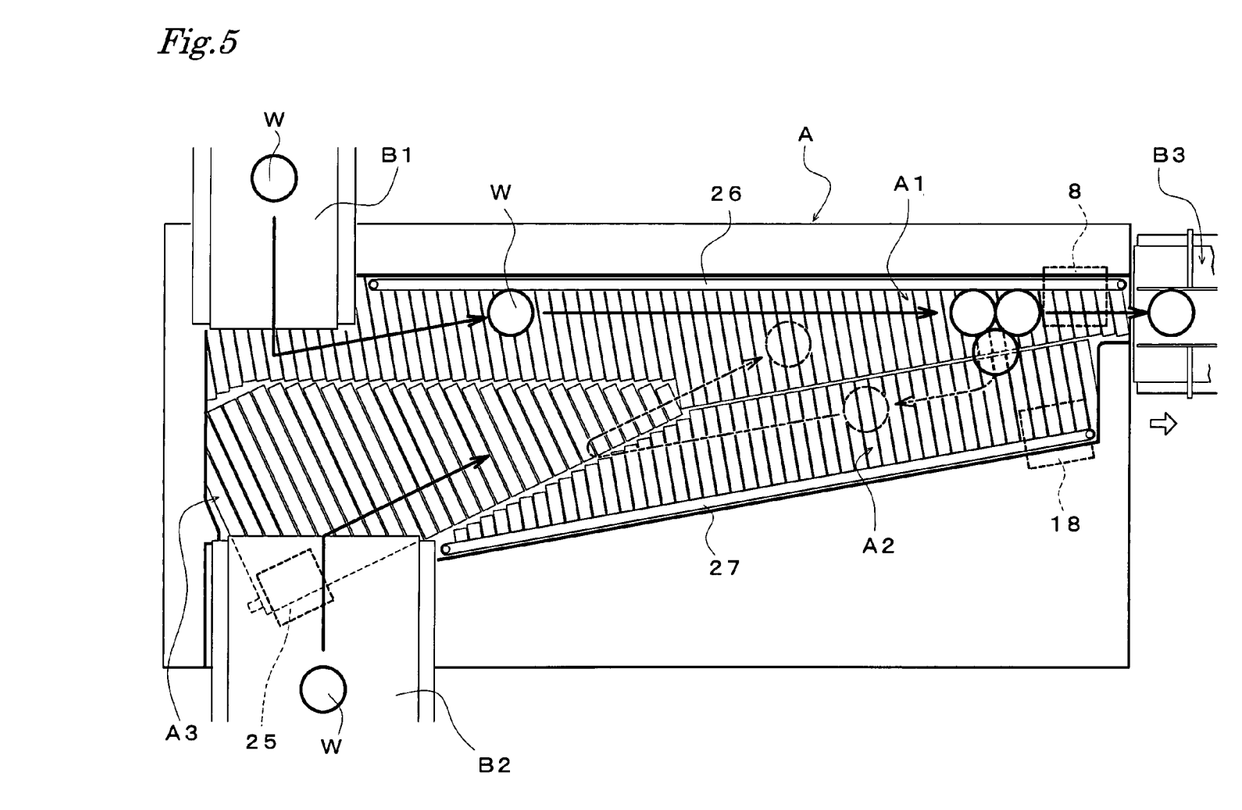
FIG. 5 is a schematic plan view showing a variation of side plates of a main conveying conveyor and a return conveying conveyor.

FIG. 5 shows a usage pattern in which the side plate 11 of the main conveying conveyor A1 and the side plate 20 of the return conveying conveyor A2 in the circulation type line-up conveying apparatus A according to the above-described embodiment have been constructed by belt conveyors 26 and 27 respectively.

The side plates 11 and 20 according to the embodiment are capable of conveying smoothly when the objects W to be conveyed are hard, for example, objects packaged with cases made of resin or the like because they are low in frictional resistance. When, however, the objects W to be conveyed are soft ones such as confectionery and bread, they are high in frictional resistance during contact, and there may be cases where they cannot be smoothly conveyed. In such cases, if the side plate itself rotates in the same direction as the conveying direction of the conveying conveyor at a fixed position, it will be possible to convey the objects W to be conveyed in collaboration with the conveying force of the conveying conveyor, and to solve the problem.

As an alternative to the belt conveyors 26, 27, roller conveyors can be used wherein the rollers are vertically oriented.

Also, for the driving source for the belt conveyor 26, 27 illustrated, a non-contact type power transmission system previously described can be utilized. As described in, for example, Japanese Published Unexamined Patent Application No. 11-278621, it may be possible to drive a 90°-displaced pulley through the use of the driving shaft 6, 16, and rewind and drive the belt or the round belt with the pulley as the driving pulley, or to utilize as it is as the driving roller for driving the belt conveyor 26, 27. Of course, aside from the driving source for the circulation type line-up conveying apparatus A, an exclusive driving source may be used.

Next, with reference to FIGS. 7A to 9B, the description will be made of the line-up conveying operation of the circulation type line-up conveying apparatus A constructed as described above. In this respect, in order to make it easier to understand the movement of the objects to be conveyed, the drawings illustrate the objects to be conveyed which are supplied with a space left between them.

Figure 7A:
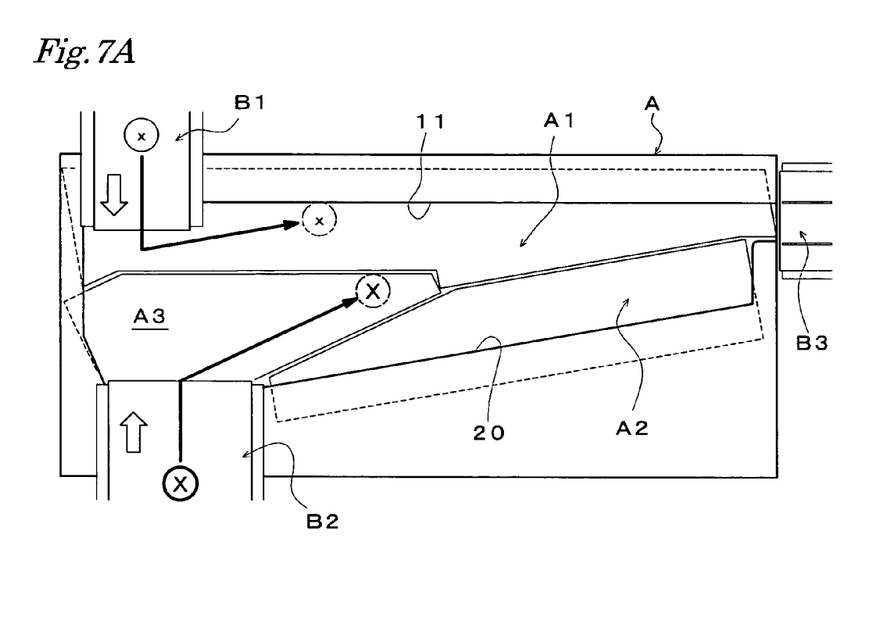
FIG. 7A shows during supplying of objects to be conveyed.

When as shown in FIG. 7A, an object x to be conveyed is supplied from a supply conveyor B1 arranged upstream of the main conveying conveyor A1 of the present conveying apparatus A to the main conveying conveyor A1 and an object X to be conveyed is supplied from a supply conveyor B2 arranged upstream of the delivery conveying conveyor A3 to the delivery conveying conveyor A3, each object to be conveyed is transferred onto the main conveying conveyor A1 and the delivery conveying conveyor A3 respectively, and is conveyed in their respective conveying directions. However, since in the main conveying conveyor A1, the conveying rollers 1 are provided side by side obliquely toward the side plate side, the object x to be conveyed is conveyed while shifting toward the side plate.

Figure 7B:
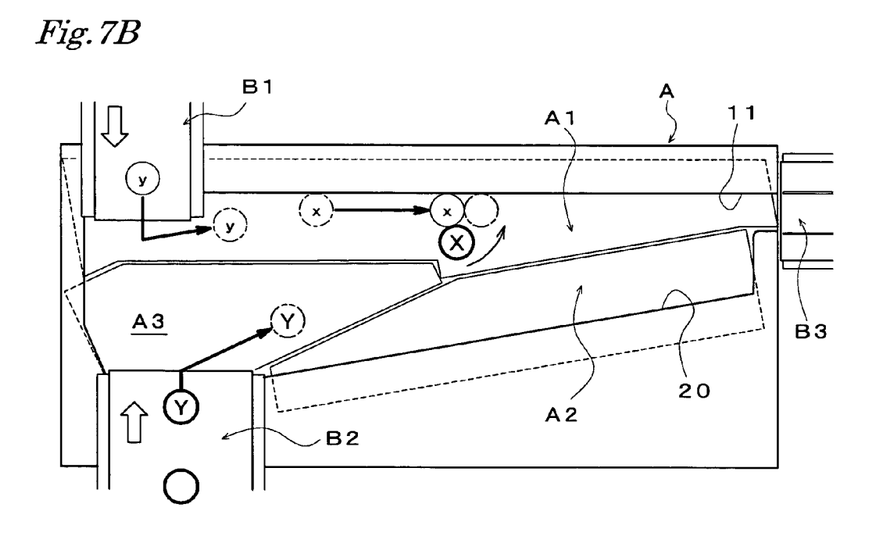
FIG. 7B shows transfer onto a delivery conveying conveyor.

Thus, as shown in FIG. 7B, the object x to be conveyed supplied to the main conveying conveyor A1 is conveyed toward the downstream side while in contact with the side plate 11, while the object X to be conveyed supplied to the delivery conveying conveyor A3 is transferred onto the main conveying conveyor A1 and is conveyed together with the object x to be conveyed. Also, to the main conveying conveyor A1 and the delivery conveying conveyor A3, next objects y, Y to be conveyed are supplied from the supply conveyor B1, B2 respectively.

Figure 8A:
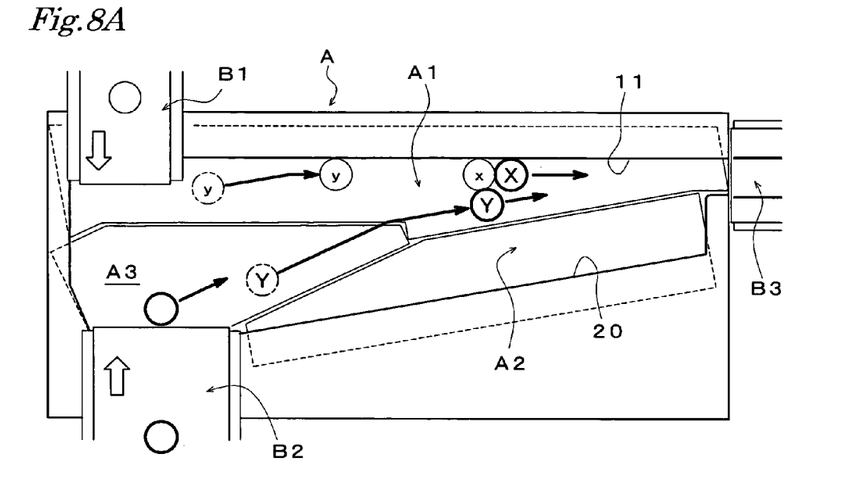
FIG. 8A shows a state in which the objects to be conveyed on the delivery conveying conveyor are being transferred onto the main conveying conveyor.

Accordingly, the objects X, x, Y and y to be conveyed supplied from the supply conveyors B1 and B2 gather on the main conveying conveyor A1 as shown in FIG. 8A, and are conveyed downstream while being shifted toward the side plate 11 side by the operation of the main conveying conveyor A1.

Figure 8B:
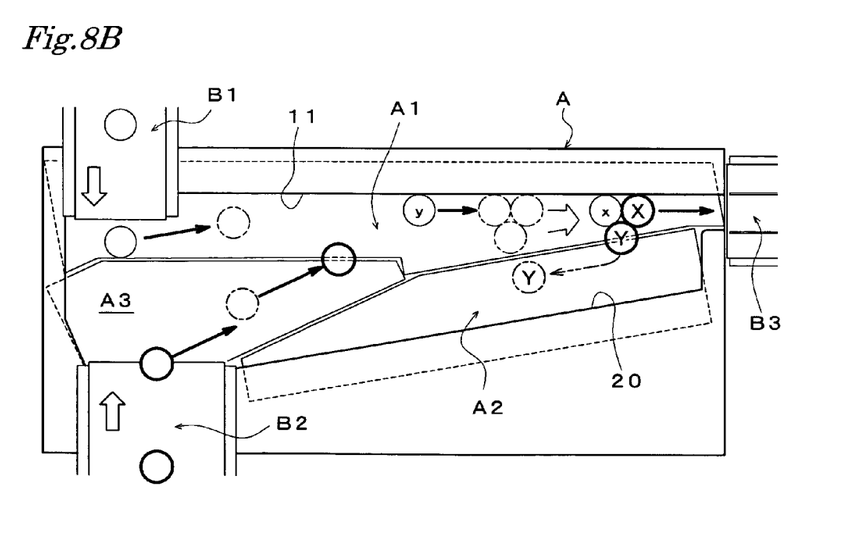
FIG. 8B shows the line-up conveying and a return conveying state of the objects to be conveyed which have projected from the line-up conveying.

In the main conveying conveyor A1, however, the roller width of the conveying rollers 1 constituting the carrier path toward the downstream side (outlet side) become gradually narrower. An open, upstream side of the return conveyor A2 is positioned alongside an open downstream side of the main conveyor A1 forming a flush conveying surface. Since the downstream outlet of the main conveying conveyor A1 has a dimension slightly wider than the width of the object W to be conveyed, the object Y to be conveyed which has come off a line up line (one upper line in the drawing) close to the side plate 11 of the main conveying conveyor A1 and has been pushed out as shown in FIG. 8B is forced onto the adjacent return conveying conveyor A2.

Figure 9A:
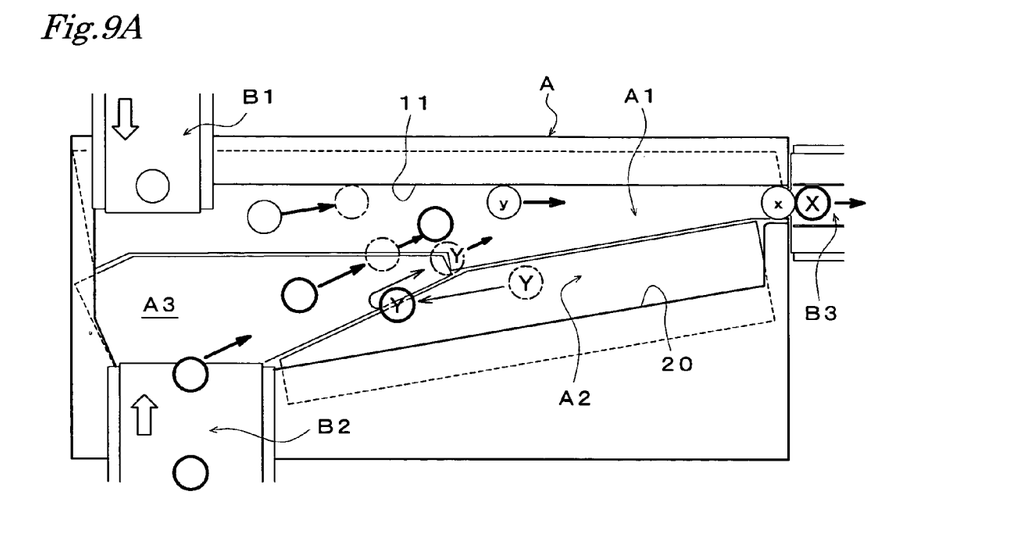
FIG. 9A shows a state in which the objects to be conveyed are transferred from the return conveying conveyor onto the delivery conveying conveyor.

Since the return conveying conveyor A2 is in an opposite direction to the main conveying conveyor A1 in the conveying direction, the objects Y to be conveyed, some of which have been placed on the return conveying conveyor A2, are transferred onto the return conveying conveyor A2 side due to the different direction of rotation and the difference in speed as shown in FIG. 9A, and are conveyed toward the downstream side of the return conveying conveyor A2, that is, toward the delivery conveying conveyor A3. In this respect, the objects X and x to be conveyed which have been placed side by side on the line-up line of the main conveying conveyor A1 are conveyed as they are, and are discharged in order in a lengthwise, single file line on a carrying-out conveyor B3 contiguously provided downstream.

Since the roller width of the conveying rollers 12 on the downstream side of the return conveying conveyor A2 has, as in the case of the main conveying conveyor A1, been formed to become gradually narrower on the open end side of the return conveying conveyor A2, and the open end side has been arranged in proximity alongside the upstream side of the delivery conveying conveyor A3, the objects Y to be conveyed which have been conveyed by the return conveying conveyor A2 are transferred onto the delivery conveying conveyor A3 due to the differences in the conveying direction and speed.

Figure 9B:
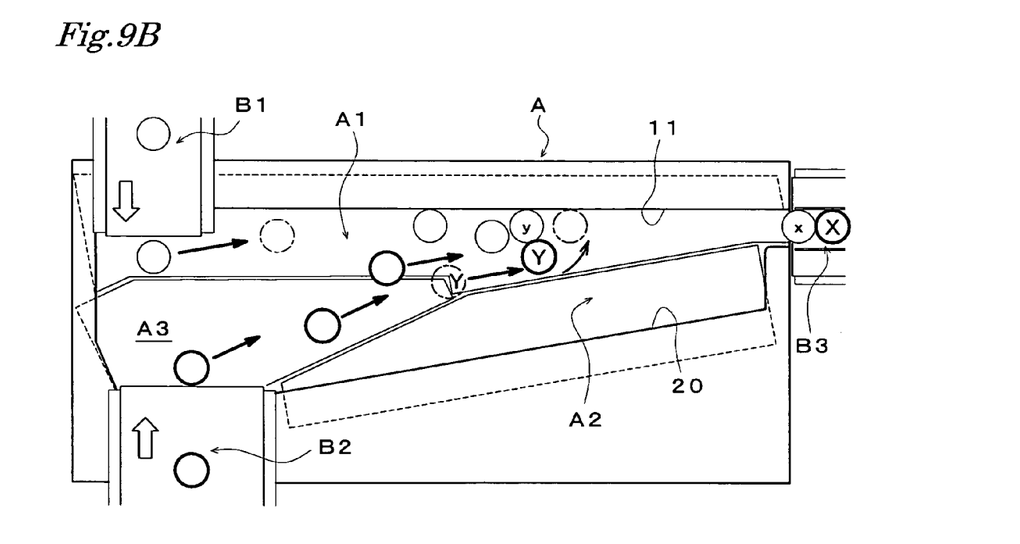
FIG. 9B shows a state in which the objects to be conveyed returned to the delivery conveying conveyor return to the main conveying conveyor.

The objects Y to be conveyed which have been transferred from the return conveying conveyor A2 onto the delivery conveying conveyor A3 are, as in the case of the objects to be conveyed which are supplied from the supply conveyor B2 as shown in FIG. 9B, transferred onto the carrier path of the main conveying conveyor A1 at the intermediate position by the operation of the delivery conveying conveyor A3, and the above-described line-up conveying is repeatedly performed in order. At this time, since the conveying speed of the conveying conveyor A3 is faster than the that of the main conveying conveyor A1, the objects to be conveyed which have been returned from the return conveying conveyor A2 to the delivery conveying conveyor A3 are conveyed toward the line-up line side prior to the objects to be conveyed which are supplied from the supply conveyor B1 to the main conveying conveyor A1.

Therefore, the objects to be conveyed, which have been overflowed from the line-up line of the main conveying conveyor A1, are automatically returned upstream of the main conveying conveyor A1 by the operation of the run conveying conveyor A2 and the delivery conveying conveyor A3, and the line-up operation is performed again.

The present invention is not limited to the above-described embodiment, but can be changed without departing from the gist of the present invention.

(1) For the driving system for each conveying roller of the main conveying conveyor, the return conveying conveyor and the delivery conveying conveyor which constitute the present apparatus, a conventional driving system (round belt driving system, chain driving system, flat and V belt driving system and the like) may be substituted.

(2) The supply of the objects to be conveyed to the present apparatus are not limited to supply to both the main conveying conveyor and the delivery conveying conveyor, and only one of them may be used, and may be provided in plural places if only the conveyor can be adapted in capacity.

(3) The width (axial length) of the conveying rollers, length of the conveying conveyors, layout and structure of each conveying conveyor, and the like of each conveying conveyor for constituting the present apparatus are determined in accordance with the size and shape of the objects to be conveyed, and the capacity of the line.

Since the circulation type line-up conveying apparatus according to the present invention is capable of reliably automatically forwarding the objects to be conveyed, which have been supplied at random and in many lines, to the next process one by one, it is easy to set to the conveying line on the upstream side such as a packaging machine.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A circulation type line-up conveying apparatus, comprising:
   a cantilever type main conveying conveyor in which a plurality of conveying rollers rotated by a non-contact type power transmission system are obliquely arranged side-by-side along a side of a side plate arranged on one side of the rollers in an axial direction, and a width of the main conveyor at least in the vicinity of a downstream end portion of the main conveyor in a conveying direction is made narrower than a width of an upstream end portion of the main conveyor;
   a return conveying conveyor formed of a plurality of side-by-side cantilever type conveying rollers rotating in a direction opposite to the direction of the main conveyor, the return conveyor having an open upstream side portion arranged alongside an open downstream side portion of said main conveyor; and
   a delivery conveying conveyor configured for transferring to the upstream end of the main conveyor objects which have been conveyed by the return conveyor from the downstream end of the main conveyor, wherein the delivery conveyor is arranged between the upstream end portion of the main conveyor and a downstream end portion of the return conveyor; and
   wherein the delivery conveyor is comprised of:
   a plurality of conveying rollers each comprising a tubular member made of non-magnetic material, a ring of a permanent magnet fitted and fixed inside said tubular member, a bearing is fitted and fixed inside the tubular member on both sides in the axial direction, and over the bearings on both sides thereof, a supporting shaft is fittingly provided to make the tubular member freely rotatable; and
   a plurality of driving magnetic wheels each corresponding to the permanent magnet of a respective one of said conveying rollers, are arranged to intersect an outer peripheral surface of the conveying roller in a non-contact state therewith and freely rotatable in proximity thereto in such a manner that the conveying rollers are rotated by rotations of the driving magnetic wheels.

2. A circulation type line-up conveying apparatus, comprising:
   a cantilever type main conveying conveyor in which a plurality of conveying rollers rotated by a non-contact type power transmission system are obliquely arranged side-by-side along a side of a side plate arranged on one side of the rollers in an axial direction, and a width of the main conveyor at least in the vicinity of a downstream end portion of the main conveyor in a conveying direction is made narrower than a width of an upstream end portion of the main conveyor;
   a return conveying conveyor formed of a plurality of side-by-side cantilever type conveying rollers rotating in a direction opposite to the direction of the main conveyor, the return conveyor having an open upstream side portion arranged alongside an open downstream side portion of said main conveyor; and
   a delivery conveying conveyor configured for transferring to the upstream end of the main conveyor objects which have been conveyed by the return conveyor from the downstream end of the main conveyor, wherein the delivery conveyor is arranged between the upstream end portion of the main conveyor and a downstream end portion of the return conveyor; and wherein the delivery conveyor is comprised of:
   a plurality of conveying rollers each comprising a tubular member made of non-magnetic material, a ring of a permanent magnet fitted and fixed inside said tubular member, a bearing is fitted and fixed inside the tubular member on both sides in the axial direction, and over the bearings on both sides thereof, a supporting shaft is fittingly provided to make the tubular member freely rotatable; and
   a plurality of driving magnetic wheels each corresponding to the permanent magnet of a respective one of said conveying rollers, are arranged to intersect an outer peripheral surface of the conveying roller in a non-contact state therewith and freely rotatable in proximity thereto in such a manner that the conveying rollers are rotated by rotations of the driving magnetic wheels;
   wherein side plates of the main conveyor and the return conveyor are side conveyors.

* * * * *